No. 799,630. PATENTED SEPT. 19, 1905.
T. S. CARROLL.
DRILL CHUCK.
APPLICATION FILED JUNE 11, 1904.

Inventor
Theron S. Carroll,

Witnesses
Geo. Ackman Jr.
Herbert D. Lawson

By Victor J. Evans
Attorney

UNITED STATES PATENT OFFICE.

THERON S. CARROLL, OF WATERBURY, CONNECTICUT.

DRILL-CHUCK.

No. 799,630.   Specification of Letters Patent.   Patented Sept. 19, 1905.

Application filed June 11, 1904. Serial No. 212,202.

*To all whom it may concern:*

Be it known that I, THERON S. CARROLL, a citizen of the United States, residing at Waterbury, in the county of New Haven and State of Connecticut, have invented new and useful Improvements in Drill-Chucks, of which the following is a specification.

My invention relates to new and useful improvements in drill-chucks; and its object is to provide a simple and compact device of this character having gripping-jaws which are loosely mounted upon the head of the chuck and which are adapted to be firmly clamped upon a drill, the entire lengths of their working faces contacting with the drill.

A further object is to provide simple and inexpensive means for automatically removing the jaws from engagement with the drill when so desired.

With the above and other objects in view the invention consists of a chuck-head having a tubular extension which terminates in a frusto-conical head having longitudinally-extending slots therein. Arranged within each slot is a gripping-jaw having a straight working face, and each jaw has an arm provided with an extension adapted to fit loosely within the tubular extension of the head. The arms of the jaws are inclosed by an elastic or spring ring, which serves to hold the working faces of the jaws normally retracted into the slots. A sleeve is revolubly mounted upon the head and the tubular extension and is so shaped that when adjusted in one direction it contracts the jaws and presses them upon any object which may be placed therebetween.

The invention also consists of the further novel construction and combination of parts hereinafter more fully described and claimed, and illustrated in the accompanying drawings, showing the preferred form of my invention, and in which—

Figure 1:
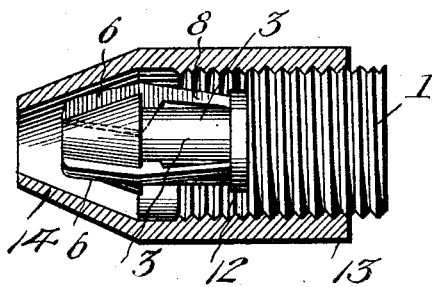
Figure 2:
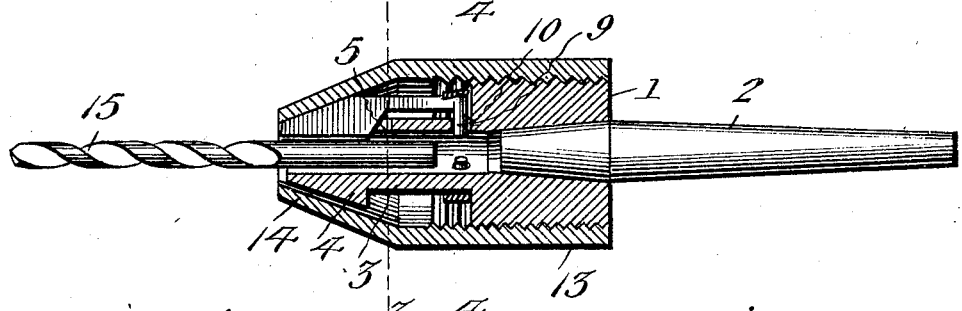
Figure 4:
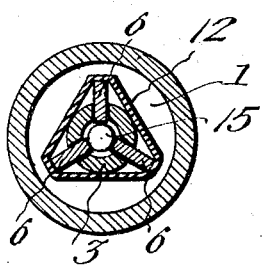
Figure 3:
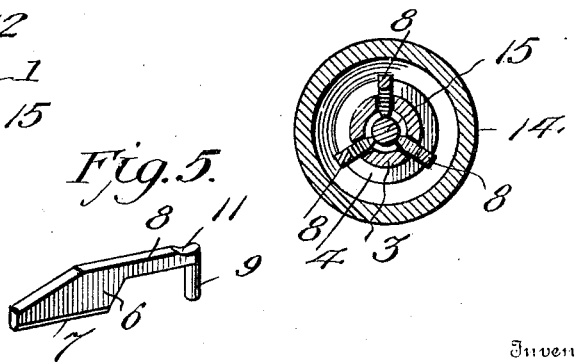
Figure 5:
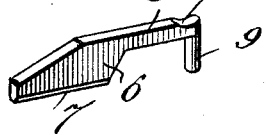

Figure 1 is a side elevation of the chuck, the sleeve being shown in section and the jaws retracted from their operative positions. Fig. 2 is a longitudinal section through the chuck and showing the jaws clamped upon one end of a drill. Fig. 3 is a section on line 3 3, Fig. 2. Fig. 4 is a section on line 4 4, Fig. 2; and Fig. 5 is a detail view of one of the jaws detached.

Referring to the figures by numerals of reference, 1 is an externally-screw-threaded head having a shank 2 extending from one end, while a tubular extension 3 projects from the center of its other end and has an enlarged frusto-conical end 4, provided with preferably three longitudinally-extending slots 5. These slots are spaced apart preferably at regular intervals, and within each is located a gripping-jaw 6, having a straight working face 7 and provided at its opposite edge with a rearwardly or inwardly extending arm 8. A stem 9 projects from the end of arm 8 and at right angles thereto and is loosely mounted within an aperture 10, formed in rear of the slot 5, in which the jaw is located. A recess 11 is formed in the outer face of each arm 8 adjacent its end, and within these recesses is seated an elastic band 12, which serves to hold the stems 9 normally pressed toward each other. The edges of the openings 10 form fulcrums on which the arms 8 swing, and therefore the jaws 6 are caused to normally assume positions removed from one another and with their working faces 7 within the slots 5. An internally-screw-threaded sleeve 13 is mounted upon the head 1 and has a contracted end 14, which is adapted to bear upon the beveled outer faces of the jaws 6 when the sleeve is adjusted in one direction, thereby forcing the jaws together.

When it is desired to use the chuck upon a drill, the sleeve 13 is rotated so that its reduced end will be moved away from the head 1. The elastic band 12 will draw the stems 9 of arms 8 toward one another, and said arms will swing upon the edges of the openings 10 and cause the jaws 6 to move apart. The end of a drill 15 can then be inserted between the jaws and into the tubular extension 3, and by rotating the sleeve 13 so as to move its contracted end toward the head 1 said contracted end will bear on the beveled faces of the jaws 6 and will press the straight working faces 7 of the jaws into contact with opposite portions of the drill. It will be seen that as the stems 9 are loosely mounted in the apertures 10 said stems are permitted to move outward when the jaws are moved upon the drill, thereby tensioning the band 12. By this arrangement of the parts it will be seen that the entire length of the straight working face of each jaw will contact with the drill, whereas this would be impossible if fixed pivots were provided for the jaws and drills of different diameters were employed. Moreover, by providing an elastic band for inclosing the arms of the jaws the cost of the device is considerably reduced. When the band becomes worn, the parts can be readily detached by removing the sleeve 13 from the head and placing a new band around the arms. It will of course be understood that instead of employing an elastic band a split spring-ring could be used.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

In a drill-chuck, a head provided with a forward tubular extension having an enlarged frusto-conical end, said extension being provided with a plurality of longitudinal slots and radial perforations disposed in rear of and in alinement respectively with the slots, a plurality of gripping-jaws seated respectively in the slots and each having a rigid active face and a rearwardly-extending arm terminating in an inwardly-projecting stem adapted to seat loosely in one of the perforations, the engaging stems being extended radially of the head and the jaws adapted for free radial movement, the jaws being provided at their inner ends with recesses situated respectively at the outer ends of the engaging stems, an elastic band seated in the recesses and designed to surround the inner ends of all the jaws for normally pressing them inward, the inner ends of the jaws being adapted to move outward and expand the band under the influence of a tool-shank introduced into the chuck, and a tubular sleeve threaded onto the body and having a conical portion designed to act upon the gripping-jaws for moving the latter to active position.

In testimony whereof I affix my signature in presence of two witnesses.

THERON S. CARROLL.

Witnesses:
MARY C. O'NEILL,
MICHAEL J. BYRNE.